US012589861B2

(12) United States Patent
    Kawauchi

(10) Patent No.:     US 12,589,861 B2
(45) Date of Patent:        Mar. 31, 2026

(54) MOVING OBJECT

(71) Applicant: HONDA MOTOR CO., LTD., Tokyo (JP)

(72) Inventor: Ryo Kawauchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/084,591

(22) Filed: Mar. 19, 2025

(65) Prior Publication Data

US 2025/0304243 A1      Oct. 2, 2025

(30) Foreign Application Priority Data

Mar. 26, 2024      (JP) ................................. 2024-049234

(51) Int. Cl.
    B64C 21/00          (2023.01)
    B64C 29/00          (2006.01)
(52) U.S. Cl.
    CPC .......... B64C 21/00 (2013.01); B64C 29/0091 (2013.01)
(58) Field of Classification Search
    CPC ...... B64D 17/80; B64D 17/78; B64C 27/006; F42B 10/50; F42B 10/14; F42B 10/143
    See application file for complete search history.

(56) References Cited

U.S. PATENT DOCUMENTS 10,532,815  B1      1/2020   Thrun et al.
2017/0067725  A1*   3/2017   Hammond .............. F42B 10/14

FOREIGN PATENT DOCUMENTS

EP          0499907  A2 *    8/1992   .............. F42B 10/14

* cited by examiner

*Primary Examiner* — Ashesh Dangol
(74) *Attorney, Agent, or Firm* — Rankin, Hill & Clark LLP

(57)              ABSTRACT

A moving object includes a moving object main body, a resistance structure which can be switched at least from a retracted state to a deployed state, and a holding structure which holds the resistance structure in the retracted state. The resistance structure includes an engagement recess. The holding structure includes a holding main body portion supported by the moving object main body, and a rotating body configured to be engaged with the engagement recess in the retracted state of the resistance structure. When a force equal to or larger than a predetermined force is applied to the resistance structure, engagement of the rotating body with the engagement recess is released, and the resistance structure is switched from the retracted state to the deployed state.

11 Claims, 5 Drawing Sheets

10

MOVING OBJECT

CROSS-REFERENCE TO RELATED APPLICATIONS

This application is based upon and claims the benefit of priority from Japanese Patent Application No. 2024-049234 filed on Mar. 26, 2024, the contents of which are incorporated herein by reference.

BACKGROUND OF THE INVENTION

Field of the Invention

The present invention relates to a moving object.

Description of the Related Art

In recent years, research and development have been conducted on energy efficiency technology in various fields including moving objects in order to ensure access of more people to affordable, reliable, sustainable and modern energy. For example, U.S. Pat. No. 10,532,815 B1 discloses a moving object (flying object) which has a rotor as a propulsion device and can take off and land vertically. The rotor is rotationally driven by a drive source (motor) that receives electric power from a battery.

SUMMARY OF THE INVENTION

In order to enable the moving object to take off and land vertically, a large propulsion system (a propulsion device, a drive source, and a battery) is required, but the propulsion system is desired to be lightweight. In such a case, for example, it is conceivable to provide a resistance structure that switches from a retracted state to a deployed state when landing and functions to increase air resistance. However, in the case that a complicated structure or a structure requiring power consumption is employed as the holding structure for holding the resistance structure in the retracted state, the propulsion system can be reduced in size, but the weight of the holding structure may increase. Therefore, a lightweight holding structure is desired.

An object of the present invention is to solve the above-mentioned problem.

An aspect of the present invention is characterized by a moving object including: a moving object main body; a resistance structure including a first end portion and a second end portion, which are opposite to each other, the first end portion being pivotably attached to the moving object main body, the resistance structure being switchable at least from a retracted state to a deployed state; and a holding structure configured to be engaged with the second end portion of the resistance structure to thereby hold the resistance structure in the retracted state, wherein the second end portion of the resistance structure includes an engagement recess that is recessed toward the first end portion, wherein the holding structure includes: a holding main body portion supported by the moving object main body; and a rotating body rotatably supported by the holding main body portion and configured to be engaged with the engagement recess in the retracted state of the resistance structure, and wherein, when a force equal to or greater than a predetermined force is applied to the resistance structure, engagement of the rotating body with the engagement recess is released to thereby switch the resistance structure from the retracted state to the deployed state.

According to the present invention, the holding mechanism can hold the resistance structure in the retracted state with a simple configuration, and thus the weight of the holding structure can be reduced. Therefore, it is possible to suppress an increase in weight due to the provision of the resistance structure and the holding structure in the moving object. This contributes to energy efficiency.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
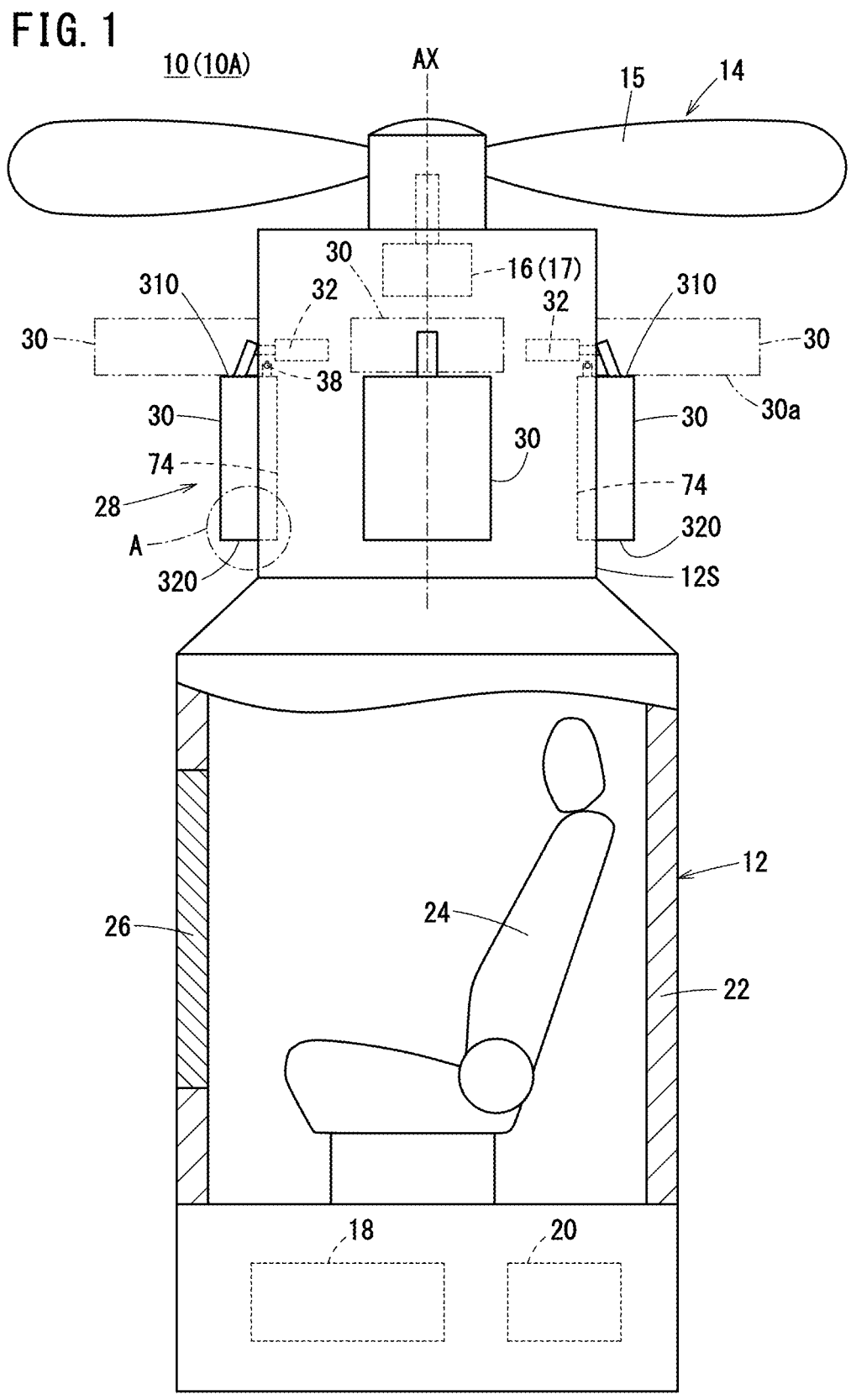
FIG. 1 is a side view of a moving object according to an embodiment of the present invention.

As shown in FIG. 1, a moving object 10 according to an embodiment of the present invention is configured as an aircraft 10A. The aircraft 10A is configured for vertical takeoff and landing. Note that the application target of the present invention is not limited to the aircraft 10A, and may be a moving object 10 (for example, an automobile) other than the aircraft 10A.

The moving object 10 includes a moving object main body 12, a propulsion device 14, a drive source 16, a battery 18, and a control device 20. The moving object main body 12 is a fuselage of the moving object 10. The moving object main body 12 is generally cylindrical in shape. The moving object main body 12 includes a cabin 22. A seat 24 for an occupant to sit on is disposed in the cabin 22. The cabin 22 is provided with a door 26. The propulsion device 14 is disposed on an upper portion of the moving object main body 12. The propulsion device 14 has a rotor 15. The rotor 15 is a propeller. The rotation of the rotor 15 provides an upward propulsive force.

The drive source 16, the battery 18, and the control device 20 are mounted inside the moving object main body 12. The drive source 16 is a motor 17 that is rotationally driven by receiving electric power from the battery 18. The drive source 16 rotates the rotor 15 of the propulsion device 14. The battery 18 supplies electric power to the motor 17. The battery 18 may be a fixed battery that is fixed to the moving object main body 12 so as not to be detachable, or a detachable battery that is attachable to and detachable from the moving object main body 12. The control device 20 controls the motor 17.

The moving object 10 further includes at least one air resistance unit 28. In the present embodiment, four air resistance units 28 are disposed at intervals in the circumferential direction of the moving object main body 12. More specifically, four air resistance units 28 are arranged at intervals of 90 degrees in the circumferential direction. The number of the air resistance units 28 may be three or less or five or more. These air resistance units 28 are disposed on the upper portion of the moving object main body 12.

Each air resistance unit 28 includes a resistance structure 30 and an actuator 32. The resistance structure 30 is a wing structure that can be switched between a retracted state and a deployed state. As shown in FIG. 1, in the retracted state of the resistance structure 30, the resistance structure 30 is substantially parallel to the axis AX of the moving object main body 12. As shown by the imaginary lines in FIG. 1, in the developed state of the resistance structure 30, the resistance structure 30 is substantially perpendicular to the axis AX of the moving object main body 12. That is, the resistance structure 30 is pivotable by substantially 90 degrees with respect to the moving object main body 12. Hereinafter, the lower surface of the resistance structure 30 in the deployed state of the resistance structure 30 is referred to as a "back surface 30a".

The resistance structure 30 is a plate-shaped structure. The resistance structure 30 may have any shape when viewed in the thickness direction of the resistance structure 30. The resistance structure 30 may have, for example, a polygonal shape such as a pentagonal shape or a hexagonal shape, a circular shape, or an elliptical shape.

The resistance structure 30 has a first end portion 310 and a second end portion 320, which are opposite to each other. The first end portion 310 of the resistance structure 30 is pivotably attached to the moving object main body 12 via a hinge 38. The first end portion 310 of the resistance structure 30 is located at the top of the resistance structure 30 in the retracted state of the resistance structure 30. The first end portion 310 of the resistance structure 30 is a portion (an inner end portion in the deployed state) close to the moving object main body 12 in the developed state of the resistance structure 30.

In the retracted state of the resistance structure 30, the second end portion 320 of the resistance structure 30 is located at the bottom of the resistance structure 30. As indicated by the imaginary lines, in the deployed state of the resistance structure 30, the second end portion 320 of the resistance structure 30 is a portion (an outer end portion in the developed state) far from the moving object main body 12.

Figure 2:
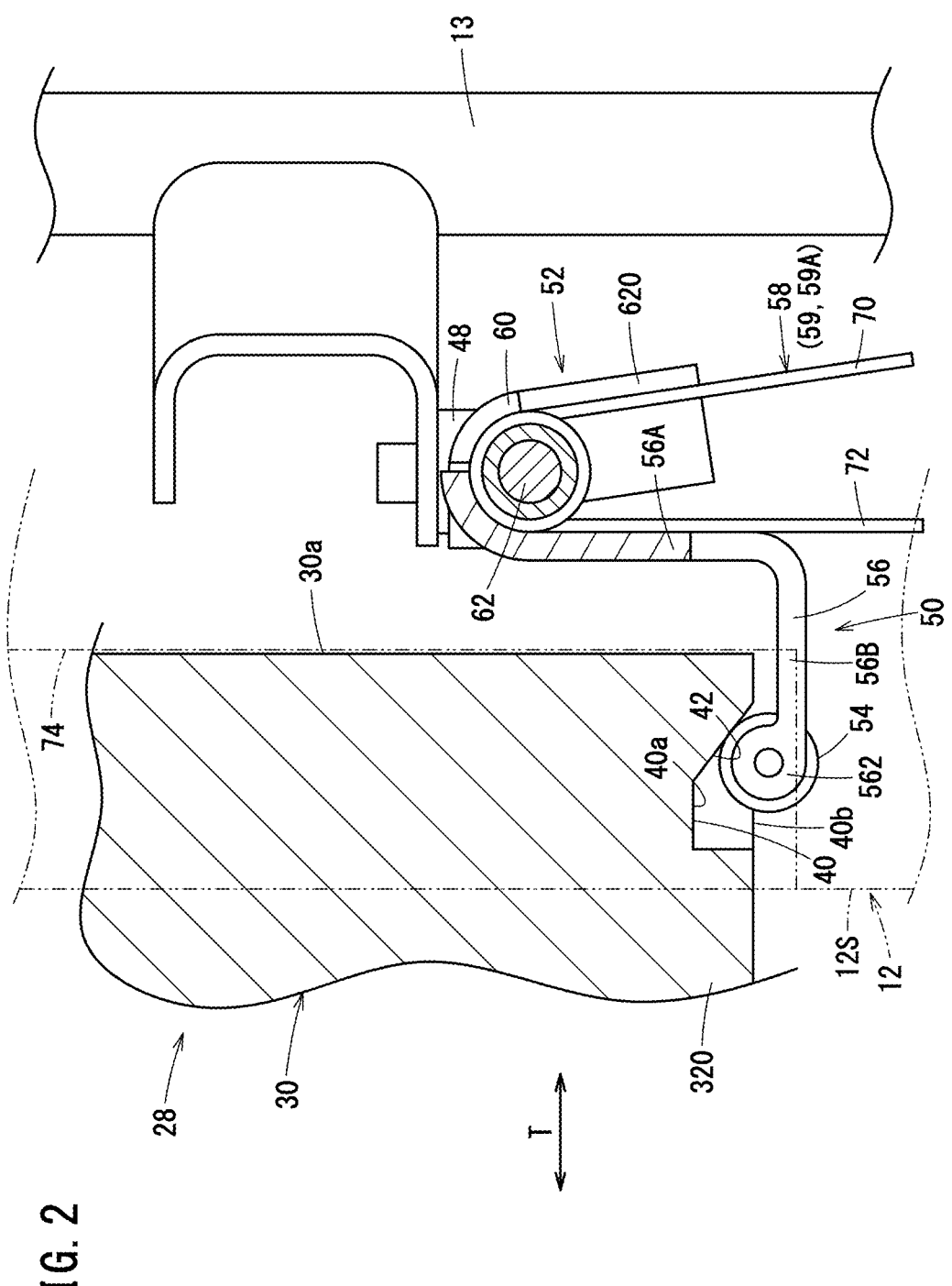
FIG. 2 is an enlarged view of a portion A in FIG. 1.

FIG. 2 is an enlarged view of a portion A in FIG. 1. In FIG. 2, the moving object main body 12 is shown by an imaginary line. The second end portion 320 of the resistance structure 30 has an engagement recess 40 recessed toward the first end portion 310. The engagement recess 40 is positioned at a portion, of the second end portion 320, that is close to the back surface 30a of the resistance structure 30. The engagement recess 40 may be positioned at a portion, of the second end portion 320, that is substantially at the center in the thickness direction (the T direction in FIG. 2) of the resistance structure 30. The engagement recess 40 has an inclined portion 42. The inclined portion 42 is an end portion, of the engagement recess 40, that is closer to the back surface 30a of the resistance structure 30. In the retracted state of the resistance structure 30, the inclined portion 42 is inclined toward the inside of the moving object main body 12 in a direction (downward in FIG. 2) from the bottom 40a of the concave shape of the engagement recess 40 toward an opening 40b thereof.

In FIG. 1, the actuator 32 operates to switch the resistance structure 30 from the retracted state to the deployed state. The actuator 32 operates to switch the resistance structure 30 from the deployed state to the retracted state. The actuator 32 is coupled to the first end portion 310 of the resistance structure 30. The actuator 32 is disposed inside the moving object main body 12. The actuator 32 is configured by, for example, a motor for deployment and retraction. In this case, the motor for deployment and retraction operates by receiving power supply from the battery 18. The actuator 32 may be a pneumatic cylinder or a hydraulic cylinder.

As shown in FIG. 2, the air resistance unit 28 further includes a holding structure 50. The holding structure 50 engages with the second end portion 320 of the resistance structure 30 to hold the resistance structure 30 in the retracted state. The holding structure 50 includes a holding main body portion 52 and a rotating body 54. The holding main body portion 52 is supported by the moving object main body 12. The holding main body portion 52 is fixed to a fuselage frame 13 of the moving object main body 12 via a bracket 48. A part of the holding main body portion 52 is positioned inside the moving object main body 12.

Figure 3:
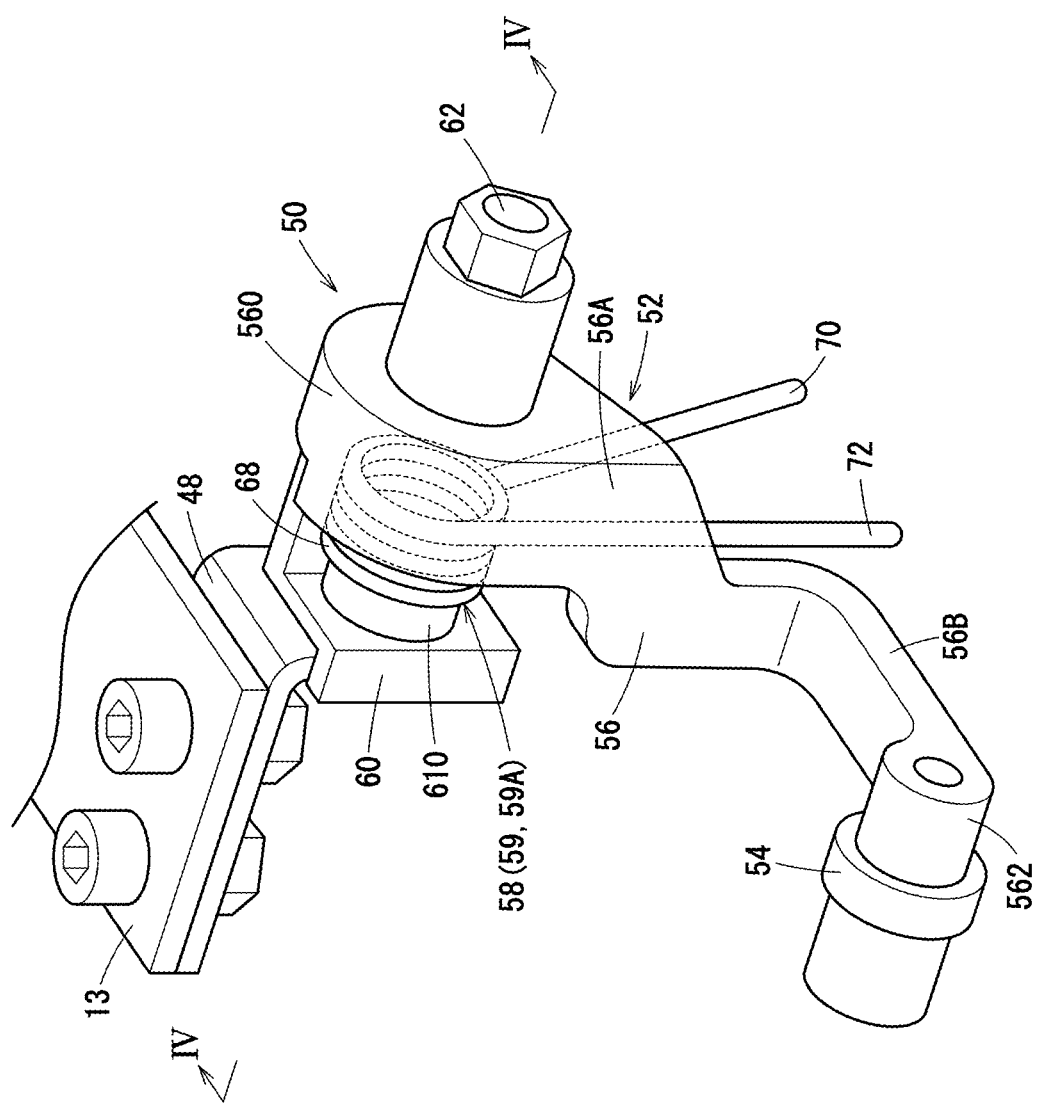
FIG. 3 is a perspective view of a holding structure.
Figure 4:
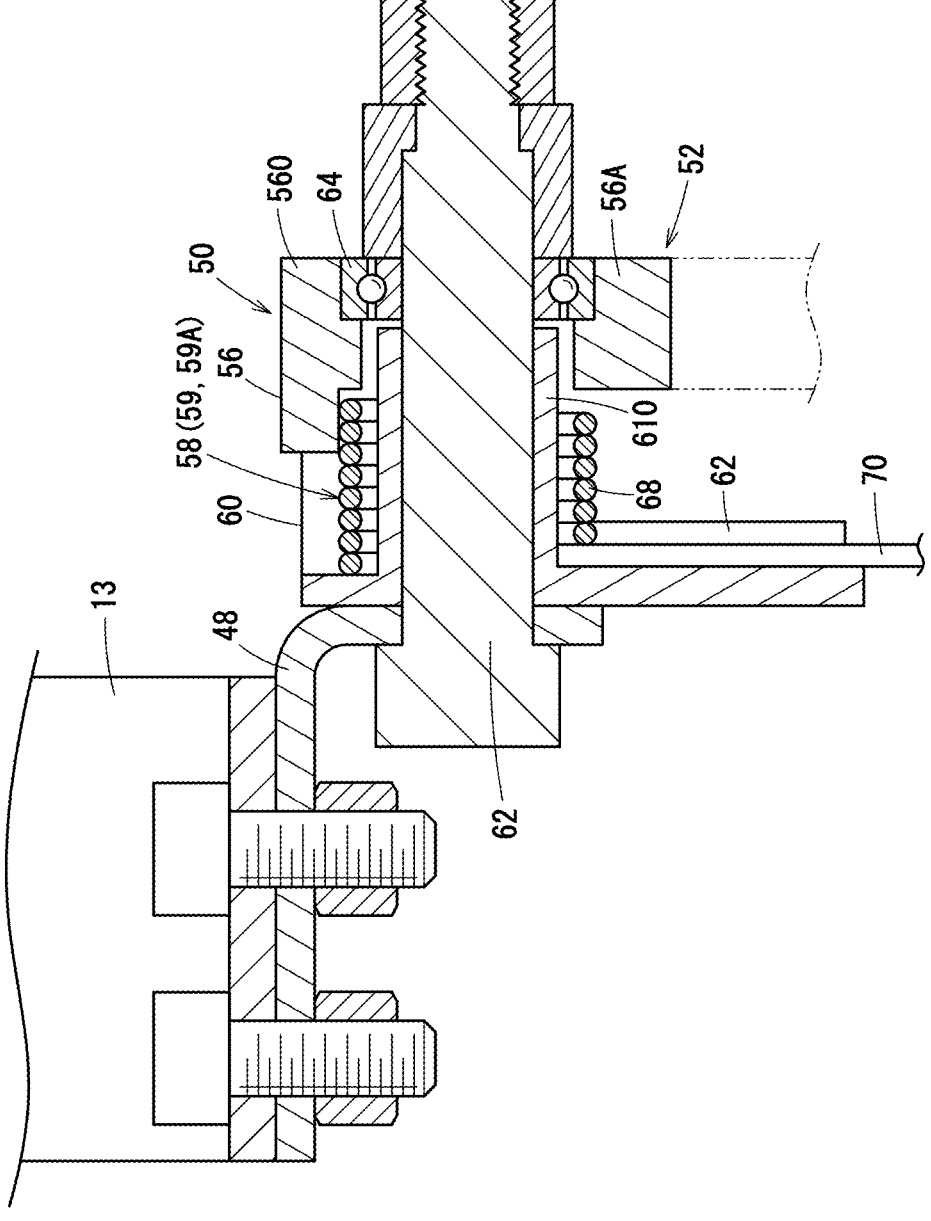
FIG. 4 is a cross-sectional view taken along line IV-IV in FIG. 3.

As shown in FIG. 3, the holding main body portion 52 includes a lever 56, an elastic member 58, and a holder 60. The lever 56 has a first portion 56A and a second portion 56B. The first portion 56A and the second portion 56B extend in directions substantially orthogonal to each other. Therefore, the lever 56 is formed into an L shape. The lever 56 is pivotably supported by the moving object main body 12 (FIG. 2). More specifically, as shown in FIG. 4, a support end portion 560 of the lever 56 is rotatably supported by a pin 62 inserted through the bracket 48 via a bearing 64. The support end portion 560 is provided on the first portion 56A of the lever 56.

The elastic member 58 elastically biases the lever 56 such that the lever 56 presses the rotating body 54 against the engagement recess 40 in the retracted state of the resistance structure 30. In the present embodiment, the elastic member 58 is a spring 59. To be more specific, the elastic member 58 is a torsion spring 59A. The torsion spring 59A includes a coil portion 68, a first arm portion 70, and a second arm portion 72. A cylindrical portion 610 of the holder 60 is inserted into the coil portion 68 of the torsion spring 59A. The coil portion 68 is supported by the cylindrical portion 610. The pin 62 is inserted into the cylindrical portion 610 of the holder 60.

As shown in FIG. 2, the first arm portion 70 of the torsion spring 59A is locked by a locking portion 620 provided on the holder 60. The second arm portion 72 of the torsion spring 59A is in contact with the first portion 56A of the lever 56. Thus, the torsion spring 59A elastically biases the lever 56 so as to press the rotating body 54 against the engagement recess 40 of the resistance structure 30.

The rotating body 54 is rotatably supported by the holding main body portion 52. The rotating body 54 is supported by a free end portion 562 provided at the second portion 56B of the lever 56. The rotating body 54 is engaged with the engagement recess 40 in the retracted state of the resistance structure 30. In the retracted state of the resistance structure 30, the rotating body 54 abuts against the inclined portion 42 of the resistance structure 30. When a force equal to or larger than a predetermined force is applied to the resistance structure 30, the engagement of the rotating body 54 with the engagement recess 40 is released, and the resistance structure 30 is switched from the retracted state to the deployed state. More specifically, when a force equal to or greater than the predetermined force is applied to the resistance structure 30, the holding main body portion 52 is deformed, and the rotating body 54 is disengaged from the engagement recess 40. As shown in FIG. 3, the rotation axis of the rotating body 54 and the rotation axis of the lever 56 are parallel to each other.

As shown in FIG. 1, the moving object main body 12 has a plurality of receiving grooves 74. The plurality of receiving grooves 74 are arranged corresponding to the plurality of resistance structures 30 disposed at intervals in the circumferential direction of the moving object main body 12. Each of the receiving grooves 74 is recessed from an outer surface 12S of the moving object main body 12. The receiving groove 74 receives at least a part in the thickness direction, of the resistance structure 30, in the retracted state of the resistance structure 30.

Figure 5:
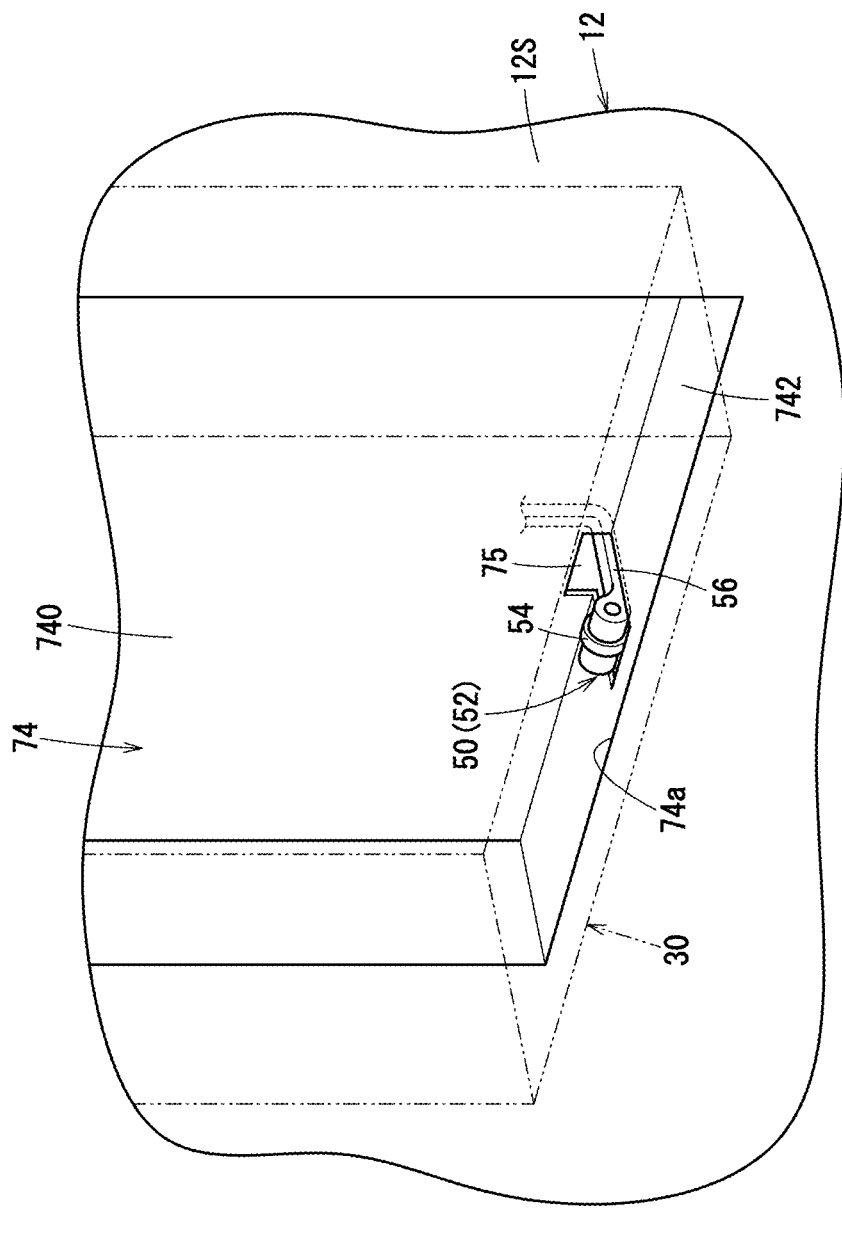
FIG. 5 is a perspective view of a receiving groove provided in a moving object main body.

As shown in FIG. 5, the receiving groove 74 includes a bottom wall portion 740 and a side wall 742. The bottom wall portion 740 is a wall located at the bottom of the receiving groove 74 in the depth direction. The side wall 742 is a wall that connects the bottom wall portion 740 and the outer surface 12S (outer surface of the fuselage) of the moving object main body 12. The side wall 742 faces the outer peripheral surface of the resistance structure 30 in the retracted state of the resistance structure 30. The receiving groove 74 has a cutout portion 75 penetrating the receiving groove 74. The cutout portion 75 is provided in an L shape across the bottom wall portion 740 and the side wall 742. The holding structure 50 holds the resistance structure 30 through the cutout portion 75. In the retracted state of the resistance structure 30, the rotating body 54 is located between an opening 74a of the receiving groove 74 and the bottom wall portion 740.

The moving object 10 according to the present embodiment operates as follows.

In FIG. 1, the moving object 10 is assumed to be at rest on the ground. The resistance structure 30 is in the retracted state. When the motor 17 is rotated by electric power from the battery 18 and the rotor 15 of the propulsion device 14 is rotated by the driving of the motor 17, an upward propulsive force is generated in the moving object 10. When the upward propulsive force becomes equal to or greater than a predetermined value, the moving object 10 vertically takes off and ascends.

In this case, as shown in FIG. 2, the rotating body 54 of the holding structure 50 is engaged with the engagement recess 40 of the resistance structure 30. More specifically, the rotating body 54 is pressed against the inclined portion 42 of the engagement recess 40 by the elastic force of the elastic member 58. Therefore, the resistance structure 30 remains held in the retracted state unless the force to rotate the resistance structure 30 in the deployment direction exceeds the engagement force between the rotating body 54 and the engagement recess 40. Thus, the resistance structure 30 is stably held in the retracted state.

For landing the moving object 10, the rotation speed of the rotor 15 is reduced. Accordingly, the moving object 10 starts to descend. In this case, the control device 20 controls the actuator 32 to switch the resistance structure 30 from the retracted state to the deployed state. Specifically, the actuator 32 pulls the resistance structure 30 in a direction to place the resistance structure 30 in the deployed state. Thus, the force to rotate the resistance structure 30 in the deployment direction exceeds the engagement force between the rotating body 54 and the engagement recess 40. As a result, the rotating body 54 climbs over the inclined portion 42 and is disengaged from the engagement recess 40, thereby releasing the engagement. In this case, the holding main body portion 52 is deformed. Specifically, the elastic member 58 is deformed, and as a result, the lever 56 rotates about the pin 62 to reach the disengaged state. In the process of the rotating body 54 climbing over the inclined portion 42 and being disengaged from the engagement recess 40, the rotating body 54 moves relative to the inclined portion 42 while rotating relative to the free end portion 562 of the lever 56. After the rotating body 54 is disengaged from the engagement recess 40, the resistance structure 30 is further rotated in the deployment direction by the driving of the actuator 32, so that the resistance structure 30 is brought into the deployed state as indicated by the imaginary lines in FIG. 1.

In the case that the resistance structure 30 is in the deployed state, air resistance increases when the moving object 10 descends. Since the air resistance increases, the rotation speed of the rotor 15 can be reduced. Therefore, the power consumption by the motor 17 can be reduced. After the moving object 10 lands, the control device 20 controls the actuator 32 to rotate the resistance structure 30 in the retracting direction. As a result, the resistance structure 30 returns to the retracted state again, as shown in FIG. 2. In this case, the rotating body 54 of the holding structure 50 is re-engaged with the engagement recess 40.

The present embodiment has the following advantageous effects.

The holding structure 50 can hold the resistance structure 30 in the retracted state with a simple configuration, and thus the weight of the holding structure 50 can be reduced. Therefore, it is possible to suppress an increase in weight due to the provision of the resistance structure 30 and the holding structure 50 in the moving object 10. This contributes to energy efficiency.

In the retracted state of the resistance structure 30, the engagement recess 40 has the inclined portion 42 that is inclined toward the inside of the moving object main body 12 in the direction from the bottom 40a to the opening 40b of the engagement recess 40. In the retracted state of the resistance structure 30, the rotating body 54 abuts against the inclined portion 42. According to such a configuration, the resistance structure 30 can be stably held in the retracted state.

When a force of a predetermined value or more is applied to the resistance structure 30, the holding main body portion 52 is deformed, and the rotating body 54 is disengaged from the engagement recess 40. According to such a configuration, since the holding main body portion 52 is deformable, when a force equal to or greater than the predetermined force is applied to the resistance structure 30, the engagement of the rotating body 54 with the engagement recess 40 can be smoothly released.

The holding main body portion 52 has the lever 56 rotatably supported by the moving object main body 12 and the elastic member 58 for biasing the lever 56 such that the lever 56 presses the rotating body 54 against the engagement recess 40. According to such a configuration, an appropriate holding force can be provided, with a simple configuration.

A part of the holding main body portion 52 is positioned inside the moving object main body 12. According to such a configuration, it is possible to reduce air resistance acting on the holding structure 50.

As shown in FIG. 5, the moving object main body 12 has a receiving groove 74 which is recessed from the outer surface 12S of the moving object main body 12 and which receives at least a part of the resistance structure 30 in the retracted state of the resistance structure 30. The receiving groove 74 has the cutout portion 75 penetrating the receiving groove 74. The holding structure 50 holds the resistance structure 30 through the cutout portion 75. According to such a configuration, most of the holding structure 50 can be stored inside the moving object main body 12.

In the retracted state of the resistance structure 30, the rotating body 54 is positioned between the opening 74a of the receiving groove 74 and the bottom wall portion 740 of the receiving groove 74. According to such a configuration, the holding structure 50 is not exposed to the outside of the moving object main body 12 in the retracted state of the resistance structure 30, and thus it is possible to reduce air resistance.

The cutout portion 75 is provided across the bottom wall portion 740 and the side wall 742. According to such a configuration, the resistance structure 30 can be suitably held by the holding structure 50 while avoiding interference between the walls constituting the receiving groove 74 and the holding structure 50.

As shown in FIG. 1, the actuator 32 is provided for switching the resistance structure 30 from the retracted state to the deployed state. According to such a configuration, the resistance structure 30 can be brought into the deployed state at an appropriate timing by the actuator 32. In addition, it is not necessary to supply energy (electric power) to the actuator 32 in the retracted state of the resistance structure 30, which contributes to energy efficiency. The actuator 32 may not be provided. In this case, the engagement between the rotating body 54 and the engagement recess 40 shown in FIG. 2 may be configured to be released by a force due to the air resistance acting on the resistance structure 30 in the retracted state when the moving object 10 descends.

The following Supplementary Notes are further disclosed in relation to the above embodiment.

Supplementary Note 1

The moving object (10) according to the present disclosure includes: the moving object main body (12); the resistance structure (30) including the first end portion (310) and the second end portion (320), which are opposite to each other, the first end portion being pivotably attached to the moving object main body, the resistance structure being switchable at least from the retracted state to the deployed state; and the holding structure (50) configured to be engaged with the second end portion of the resistance structure to thereby hold the resistance structure in the retracted state, wherein the second end portion of the resistance structure includes the engagement recess (40) that is recessed toward the first end portion, wherein the holding structure includes: the holding main body portion (52) supported by the moving object main body; and the rotating body (54) rotatably supported by the holding main body portion and configured to be engaged with the engagement recess in the retracted state of the resistance structure, and wherein, when a force equal to or greater than a predetermined force is applied to the resistance structure, engagement of the rotating body with the engagement recess is released to thereby switch the resistance structure from the retracted state to the deployed state.

Supplementary Note 2

In the moving object according to Supplementary Note 1, the engagement recess may include the inclined portion (42) that is inclined toward the inside of the moving object main body in the direction from the bottom (40a) of the engagement recess toward the opening (40b) of the engagement recess, in the retracted state of the resistance structure, and the rotating body may abut against the inclined portion in the retracted state of the resistance structure.

Supplementary Note 3

In the moving object according to Supplementary Note 1 or 2, when the force equal to or greater than the predetermined force is applied to the resistance structure, the holding main body portion may be deformed, and the rotating body may be disengaged from the engagement recess.

Supplementary Note 4

In the moving object according to any one of Supplementary Notes 1 to 3, the holding main body portion may include: the lever (56) pivotably supported by the moving object main body; and the elastic member (58) configured to bias the lever such that the lever presses the rotating body against the engagement recess.

Supplementary Note 5

In the moving object according to any one of Supplementary Notes 1 to 4, a part of the holding main body portion may be positioned inside the moving object main body.

Supplementary Note 6

In the moving object according to Supplementary Note 5, the moving object main body may include the receiving groove (74) that is recessed from the outer surface (12S) of the moving object main body and configured to receive at least a part of the resistance structure in the retracted state of the resistance structure, the receiving groove may include the cutout portion (75) penetrating the receiving groove, and the holding structure may hold the resistance structure via the cutout portion.

Supplementary Note 7

In the moving object according to Supplementary Note 6, the receiving groove may include: the bottom wall portion (740) located at the bottom of the receiving groove in the depth direction of the receiving groove; and the side wall (742) that connects the bottom wall portion and the outer surface and faces the outer circumferential surface of the resistance structure in the retracted state of the resistance structure, and wherein, in the retracted state of the resistance structure, the rotating body may be positioned between the opening (74a) of the receiving groove and the bottom wall portion.

Supplementary Note 8

In the moving object according to Supplementary Note 7, the cutout portion may be provided across the bottom wall portion and the side wall.

Supplementary Note 9

The moving object according to any one of Supplementary Notes 1 to 8 may further include the actuator (32) coupled to the first end portion of the resistance structure to switch the resistance structure from the retracted state to the deployed state.

Although the present disclosure has been described in detail, the present disclosure is not limited to the above-described embodiments. In these embodiments, various addition, replacement, changing, partial deletion, and the like can be made without departing from the essence and gist of the present disclosure or without departing from the essence and gist of the present disclosure derived from the contents described in the claims and equivalents thereof. These embodiments may also be implemented in combination. For example, in the above-described embodiments, the order of operations and the order of processes are shown as examples, and the present invention is not limited to them. The same applies to a case where numerical values or mathematical equations are used in the description of the above-described embodiments.

The invention claimed is:

1. A moving object comprising:
a moving object main body;
a resistance structure including a first end portion and a second end portion, which are opposite to each other, the first end portion pivotably attached to the moving object main body, the resistance structure switchable at least from a retracted state to a deployed state by pivoting in a radial direction of the moving object main body; and
a holding structure configured to be engaged with the second end portion of the resistance structure to thereby hold the resistance structure in the retracted state,
wherein the second end portion of the resistance structure includes an engagement recess that is recessed toward the first end portion,
wherein the holding structure includes:
a holding main body portion supported by the moving object main body; and
a rotating body rotatably supported by the holding main body portion and configured to be engaged with the engagement recess in the retracted state of the resistance structure, and
wherein, when a force equal to or greater than a predetermined force is applied to the resistance structure in the radial direction by an actuator, engagement of the rotating body with the engagement recess is released to thereby allow the resistance structure to move from the retracted state to the deployed state.

2. The moving object according to claim 1, wherein when the force equal to or greater than the predetermined force is applied to the resistance structure, the holding main body portion is deformed, and the rotating body is disengaged from the engagement recess.

3. The moving object according to claim 1, wherein a part of the holding main body portion is positioned inside the moving object main body.

4. The moving object according to claim 3, wherein the moving object main body includes a receiving groove that is recessed from an outer surface of the moving object main body and configured to receive at least a part of the resistance structure in the retracted state of the resistance structure,
the receiving groove includes a cutout portion that penetrates the receiving groove, and
the holding structure holds the resistance structure via the cutout portion.

5. The moving object according to claim 4, wherein the receiving groove includes:
a bottom wall portion located at a bottom of the receiving groove in a depth direction of the receiving groove; and
a side wall that connects the bottom wall portion and the outer surface and faces an outer circumferential surface of the resistance structure in the retracted state of the resistance structure, and
wherein, in the retracted state of the resistance structure, the rotating body is positioned between an opening of the receiving groove and the bottom wall portion.

6. The moving object according to claim 5, wherein the cutout portion is provided across the bottom wall portion and the side wall.

7. The moving object according to claim 1, further comprising
the actuator coupled to the first end portion of the resistance structure to switch the resistance structure from the retracted state to the deployed state.

8. The moving object according to claim 1,
wherein the holding main body portion includes a support end portion that is rotatably supported within the moving object main body,
wherein, in the retracted state of the resistance structure, part of an outer wall of the moving object main body is present between the support end portion and the resistance structure in the radial direction of the moving object main body.

9. The moving object according to claim 1, wherein
the resistance structure continues being driven in the radial direction by the actuator after the engagement of the rotating body with the engagement recess is released, whereby the resistance structure moves to the deployed state.

10. A moving object comprising:
a moving object main body;
a resistance structure including a first end portion and a second end portion, which are opposite to each other, the first end portion pivotably attached to the moving object main body, the resistance structure switchable at least from a retracted state to a deployed state by pivoting in a radial direction of the moving object main body; and
a holding structure configured to be engaged with the second end portion of the resistance structure to thereby hold the resistance structure in the retracted state,
wherein the second end portion of the resistance structure includes an engagement recess that is recessed toward the first end portion,
wherein the holding structure includes:
a holding main body portion supported by the moving object main body; and
a rotating body rotatably supported by the holding main body portion and configured to be engaged with the engagement recess in the retracted state of the resistance structure, and
wherein, when a force equal to or greater than a predetermined force is applied to the resistance structure in the radial direction, engagement of the rotating body with the engagement recess is released to thereby allow the resistance structure to move from the retracted state to the deployed state, wherein
the engagement recess includes an inclined portion that is inclined in a direction in which the rotating body moves relatively and inclined toward an inside of the moving object main body in a direction from a bottom of the engagement recess toward an opening of the engagement recess, in the retracted state of the resistance structure, and
the rotating body abuts against the inclined portion in the retracted state of the resistance structure.

11. A moving object comprising:
a moving object main body;
a resistance structure including a first end portion and a second end portion, which are opposite to each other, the first end portion pivotably attached to the moving object main body, the resistance structure switchable at least from a retracted state to a deployed state; and
a holding structure configured to be engaged with the second end portion of the resistance structure to thereby hold the resistance structure in the retracted state, wherein the second end portion of the resistance structure includes an engagement recess that is recessed toward the first end portion, wherein the holding structure includes:

a holding main body portion supported by the moving object main body; and a rotating body rotatably supported by the holding main body portion and configured to be engaged with the engagement recess in the retracted state of the resistance structure, and wherein, when a force equal to or greater than a predetermined force is applied to the resistance structure, engagement of the rotating body with the engagement recess is released to thereby switch the resistance structure from the retracted state to the deployed state, wherein the holding main body portion includes:

a lever pivotably supported by the moving object main body; and an elastic member configured to bias the lever in a manner so that the lever presses the rotating body against the engagement recess.

\* \* \* \* \*